United States Patent
Yao et al.

(10) Patent No.: US 11,350,329 B2
(45) Date of Patent: May 31, 2022

(54) SIGNAL MANAGEMENT METHOD, RELATED APPARATUS, AND RELATED SYSTEM

(71) Applicant: HUAWEI TECHNOLOGIES CO., LTD., Guangdong (CN)

(72) Inventors: Shunquan Yao, Shenzhen (CN); Xiang Wu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/883,034

(22) Filed: May 26, 2020

(65) Prior Publication Data
US 2020/0288364 A1 Sep. 10, 2020

Related U.S. Application Data

(63) Continuation of application No. PCT/CN2018/117222, filed on Nov. 23, 2018.

(30) Foreign Application Priority Data

Nov. 28, 2017 (CN) .......................... 201711224569.6

(51) Int. Cl.
*H04W 36/08* (2009.01)
*H04W 36/00* (2009.01)
*H04W 16/28* (2009.01)

(52) U.S. Cl.
CPC ........... *H04W 36/08* (2013.01); *H04W 16/28* (2013.01); *H04W 36/0085* (2018.08)

(58) Field of Classification Search
CPC . H04W 36/08; H04W 36/0085; H04W 16/28; H04W 24/10; H04W 28/0215;
(Continued)

(56) References Cited

U.S. PATENT DOCUMENTS

2012/0162009 A1  6/2012  Kim et al.

FOREIGN PATENT DOCUMENTS

| CN | 1914935 A | 2/2007 |
|----|-----------|--------|
| CN | 107071796 A | 8/2017 |

(Continued)

OTHER PUBLICATIONS

3GPP TR 38.803 V14.2.0 (Sep. 2017), 3rd Generation Partnership Project; Technical Specification Group Radio Access Network; Study on new radio access technology: Radio Frequency (RF) and co-existence aspects (Release 14), Sep. 2017. total 363 pages.

(Continued)

*Primary Examiner* — Chi H Pham
*Assistant Examiner* — Ji-Hae Yea
(74) *Attorney, Agent, or Firm* — Westerman, Hattori, Daniels & Adrian, LLP

(57) ABSTRACT

A signal measurement method, a related apparatus, and a related system. The signal measurement method executed by a terminal may include: measuring at least one candidate cell by using a second panel in a process in which the terminal performs service transmission with a first network device by using a first panel; and sending a measurement result to the first network device. The terminal is configured with a plurality of panels including the first panel and the second panel, the first panel is configured to form a beam pointing to the first network device, and the second panel is configured to form a beam pointing to the candidate cell. The measurement result includes information about a target candidate cell selected from the at least one candidate cell.

10 Claims, 5 Drawing Sheets

(58) Field of Classification Search
CPC . H04W 24/08; H04W 72/085; H04W 72/046; H04W 48/16; H04W 48/20; H04B 17/101; H04B 17/20; H04B 17/24; H04B 17/318; H04B 7/0811; H04B 7/082; H04B 7/0808; H04B 7/088; H04L 43/16; H04L 41/0896; H04L 41/0816; H04L 43/08
See application file for complete search history.

(56) References Cited

FOREIGN PATENT DOCUMENTS

| WO | 2017074488 A1 | 5/2017 | |
| WO | WO-2017074488 A1 * | 5/2017 | ........... H04B 7/0617 |
| WO | 2017196491 A1 | 11/2017 | |
| WO | WO-2017196491 A1 * | 11/2017 | ........ H04W 36/0083 |

OTHER PUBLICATIONS

3GPP TS 38.215 V1.2.0 (Nov. 2017), 3rd Generation Partnership Project; Technical Specification Group Radio Access Network; NR; Physical layer measurements (Release 15), Nov. 2017. total 12 pages.

International Search Report dated Feb. 27, 2019, issued in counterpart International Application No. PCT/CN2018/117222, with English translation (14 pages).

Du Biao et al., "Overview of Large Reflector Antenna Technology", Radio communication technology, vol. 42 Issue 1, Jan. 2016, With an English Abstract, total 8 pages.

Katsumi Watanabe et al.,"Effect of Angle Spread on System Capacity in DS/CDMA Cellular System Using Adaptive Array Antenna", 11th IEEE International Symposium on Personal Indoor and Mobile Radio Communications. PIMRC 2000. Proceedings, Sep. 2000, total 5 pages.

Notice of Allowance dated Apr. 6, 2021, issued in counterpart CN Application No. 201711224569.6, with English Translation. (8 pages).

* cited by examiner

SIGNAL MANAGEMENT METHOD, RELATED APPARATUS, AND RELATED SYSTEM

CROSS-REFERENCE TO RELATED APPLICATIONS

This application is a continuation of International Application No. PCT/CN2018/117222, filed on Nov. 23, 2018, which claims priority to Chinese Patent Application No. 201711224569.6, filed on Nov. 28, 2017. The disclosures of the aforementioned applications are hereby incorporated by reference in their entireties.

TECHNICAL FIELD

This application relates to the field of wireless communications technologies, and in particular, to a signal measurement method, a related apparatus, and a related system.

BACKGROUND

In a future wireless communications system, a beamforming technology is introduced on a terminal side. The beamforming technology is used to limit energy of a transmitted signal in a specific beam direction, to increase signal strength and improve signal receiving and sending efficiency.

After registering with a cell, a terminal transmits a service with a network device by using one or more beam pairs. Generally, data services such as internet access, video downloading, and data uploading consume a comparatively long time. The terminal may perform cell measurement while transmitting a data service. The cell measurement may be intra-frequency measurement or inter-frequency measurement.

When performing cell measurement, the terminal needs to traverse all beams to search for a candidate cell, and performs beam measurement on a beam by using which the candidate cell is found. When a receive beam used by the terminal for cell measurement is different from a receive beam used for service transmission, a beam conflict occurs.

When the beam conflict occurs, if a network device side (for example, a base station) does not configure a measurement gap (GAP) for the terminal, the terminal keeps transmitting a service, and has no time to switch to the receive beam used for cell measurement to perform cell measurement. In other words, the terminal cannot perform cell measurement. How to perform cell measurement without affecting service transmission of the terminal is an urgent problem to be resolved.

SUMMARY

This application provides a signal measurement method, a related apparatus, and a related system. The method, the apparatus, and the system may allow a terminal to complete measurement for a candidate cell by using a second panel while transmitting a service, to avoid service transmission interruption.

According to a first aspect, this application provides a signal measurement method, applied to a terminal side. The method may include: in a process in which a terminal performs service transmission with a first network device by using a first panel, measuring, by the terminal, at least one candidate cell by using a second panel, where the terminal is configured with a plurality of panels, the plurality of panels include the first panel and the second panel, the first panel is configured to form a beam pointing to the first network device, and the second panel is configured to form a beam pointing to the candidate cell; and sending, by the terminal, a measurement result to the first network device, where the measurement result includes information about a target candidate cell, and the target candidate cell is selected by the terminal from the at least one candidate cell.

By implementing the signal measurement method in the first aspect, the terminal may complete measurement for the candidate cell by using an idle panel (the second panel), and service transmission between the terminal and the first network device is not affected.

In one embodiment of this application, the first panel is one or more panels that are used by the terminal to perform service transmission with the first network device, and the second panel is one or more idle panels that are not used to perform service transmission with the first network device. The first panel and the second panel may be selected by the terminal, or may be predetermined. When the first panel and the second panel are selected by the terminal, there may be the following three selection policies.

(1) The terminal randomly selects the first panel and the second panel from all configured panels.

(2) The terminal selects a panel with a widest beam coverage area as the second panel.

(3) The terminal selects a panel with a wide coverage area of total beams as the second panel.

Optionally, in one embodiment of this application, the second panel may form a plurality of receive beams covering all directions.

In one embodiment of this application, in a process in which the terminal performs service transmission with the first network device by using the first panel, the terminal may be triggered to measure the at least one candidate cell in the following two cases.

In a first case, the terminal may be triggered to measure the at least one candidate cell when the first network device sends candidate cell measurement requirement to the terminal.

In a second case, the terminal may be triggered to measure the at least one candidate cell when signal quality of a downlink signal currently sent by the first network device is lower than a preset threshold. The signal quality may be determined by amplitude hysteresis, a quantity of downlink signals, or time-to-trigger.

The candidate cell measurement may be intra-frequency measurement, or may be inter-frequency measurement. This is not limited in this application.

In one embodiment of this application, when the terminal measures the at least one candidate cell by using the second panel, an antenna array is adjusted on the second panel, to separately form a plurality of receive beams pointing to different directions, and the at least one candidate cell is measured by using the plurality of receive beams. Measurement for the candidate cell includes the following two steps.

Step 1: The terminal performs candidate cell search by using the plurality of receive beams.

Step 2: The terminal performs beam measurement on a beam by using which a candidate cell is found.

In one embodiment, when a receive beam used by the terminal for service transmission is different from a receive beam used to measure the at least one candidate cell, the terminal measures the at least one candidate cell by using the second panel. Different receive beams are beams with different directions, or beams with different spatial receive parameters and/or different antenna ports.

According to a second aspect, this application provides a terminal, configured to perform the signal measurement method described in the first aspect. The terminal may include a memory and a processor, a transmitter, and a receiver that are coupled to the memory. The transmitter is configured to send a signal to a first network device, another network device, or another terminal. The receiver is configured to receive a signal sent by the first network device, the another network device, or the another terminal. The memory is configured to store implementation code of the signal measurement method described in the first aspect. The processor is configured to execute program code stored in the memory, in other words, perform the signal measurement method provided in the first aspect or any one of the possible implementations of the first aspect. Optionally, an access point in the second aspect may be a chip set. The memory and the processor may be integrated on a same chip, or may be respectively disposed on different chips.

According to a third aspect, this application provides a terminal, including a plurality of function modules, configured to correspondingly perform the signal measurement method provided in the first aspect or any one of the possible implementations of the first aspect.

According to a fourth aspect, a computer readable storage medium is provided. The readable storage medium stores program code for implementing the signal measurement method described in the first aspect, and the program code includes an executable instruction for running the signal measurement method described in the first aspect.

According to a fifth aspect, this application provides a computer program product including an instruction. When the computer program product is run on a computer, the computer is enabled to perform the signal measurement method described in the first aspect.

According to a sixth aspect, this application provides a communications system. The communications system includes a terminal and a network device. The terminal may be the terminal described in the second aspect or the third aspect, and the network device may include the first network device described in the first aspect and another network device.

By implementing some embodiments of this application, regardless of whether a measurement GAP is configured for the terminal, the terminal may complete measurement for the candidate cell by using the second panel while transmitting a service, to avoid service transmission interruption.

DESCRIPTION OF EMBODIMENTS

Terms used in an implementation part of this application are only used to explain specific embodiments of this application, but are not intended to limit this application.

Figure 1:
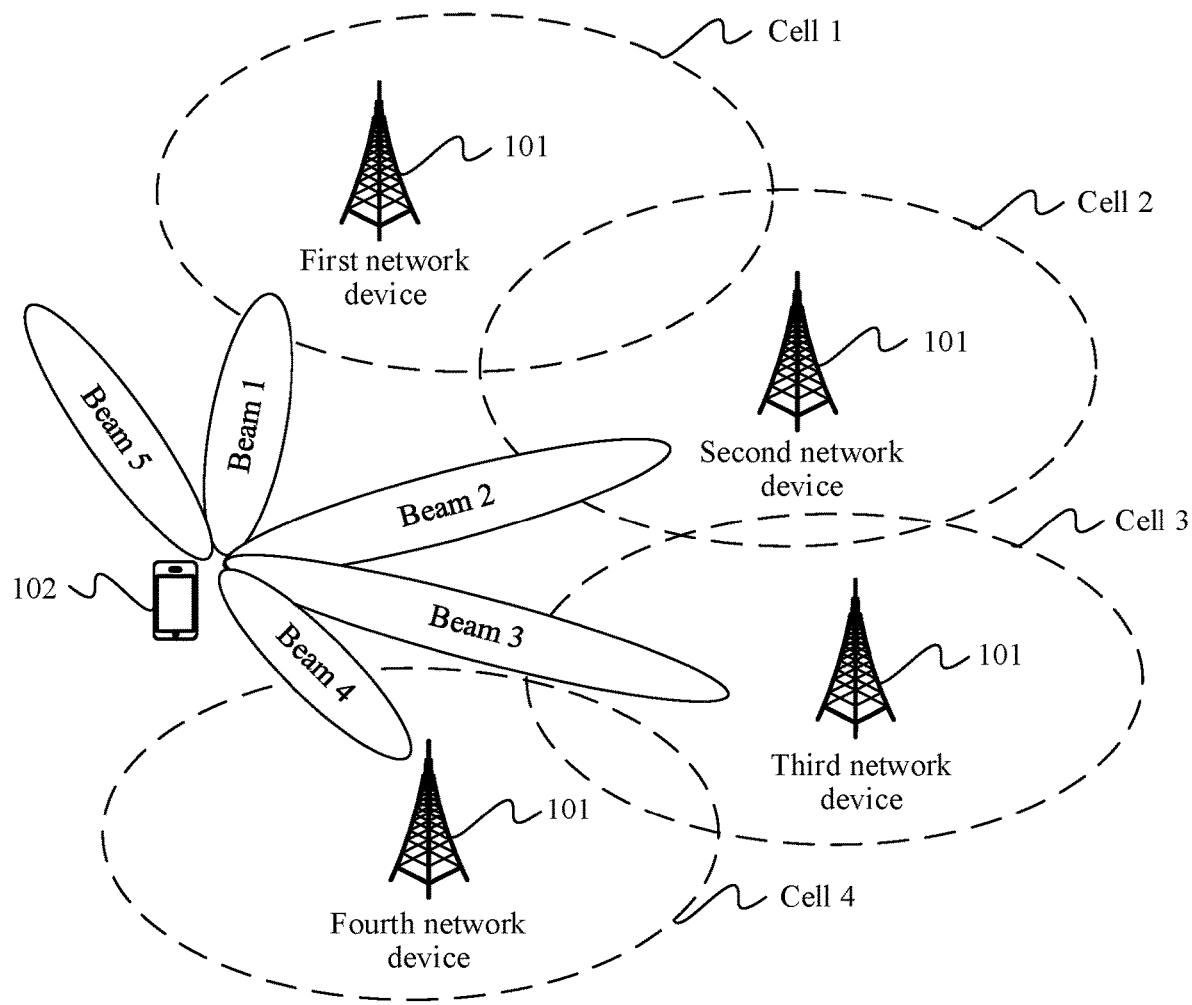
FIG. 1 is a schematic structural diagram of a communications system according to an embodiment of this application.

FIG. 1 shows a wireless communications system according to one embodiment of this application. The wireless communications system may be a long term evolution (LTE) system, a future evolved 5th generation (5G) mobile communications system, a future evolved new radio (NR) system, a machine-to-machine (M2M) communications system, or the like. As shown in FIG. 1, the wireless communications system 100 may include one or more network devices 101, one or more terminals 102, and a core network (not shown).

Referring to FIG. 1, if the network device side configures a measurement GAP for the terminal, the terminal may switch to a receive beam used for cell measurement to perform cell measurement in a measurement GAP that appears in each period. However, the measurement GAP reduces time used by the terminal to receive a service.

The network device 101 may be a base station. The base station may be configured to communicate with one or more terminals, or may be configured to communicate with one or more base stations that have some terminal functions (for example, communication between a macro base station and a micro base station such as an access point). The base station may be a base transceiver station (BTS) in a time division synchronous code division multiple access (TD-SCDMA) system, or may be an evolved NodeB (eNB) in an LTE system, or a base station in a 5G system or a new radio (NR) system. In addition, the base station may alternatively be an access point (AP), a transmission reception point (trans TRP), a central unit (CU), or another network entity, and may include some or all of functions of the foregoing network entities.

The terminals 102 may be distributed in the entire wireless communications system 100, and may be stationary or may be mobile. In some embodiments of this application, the terminal 102 may be a mobile device, a mobile station, a mobile unit, an M2M terminal, a radio unit, a remote unit, a terminal agent, a mobile client, or the like.

In one embodiment of this application, the wireless communications system 100 is a multi-beam communications system.

The terminal 102 is configured with a plurality of panels, and each panel includes a large-scale antenna array. Beams with different directions may be formed by adjusting a weighting coefficient of each array element in the antenna array by using a beamforming technology. The beams with different directions that are formed by the terminal 102 may point to different directions.

Figure 2A:
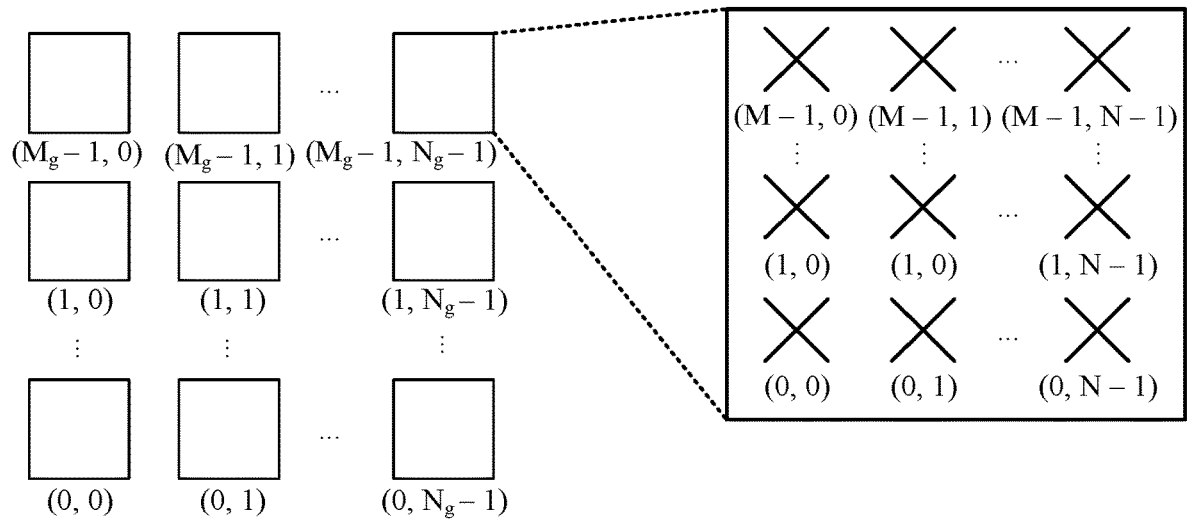
FIG. 2A is a schematic structural diagram of a terminal panel according to an embodiment of this application.

FIG. 2A shows a possible panel configuration of the terminal 102. As shown in FIG. 2A, a panel configured for the terminal 102 may be represented as ($M_g$, $N_g$, M, N, P). The terminal 102 may include $M_g$ rows and $N_g$ columns of panels, and the total quantity of panels is $M_g \times N_g$. Each panel includes M rows and N columns of antenna arrays, and the quantity of polarization directions of each antenna array is P (in FIG. 2A, two polarization directions are used as an example). A form of the antenna array shown in FIG. 2A is merely used to explain this application. In specific implementation, the antenna array may alternatively be implemented in another form. This is not limited in this application. It may be understood that the panel configuration shown in FIG. 2A is not limited thereto. When the terminal 102 is configured with a plurality of panels, the quantity and configurations of antennas on each panel may be different. This is not limited in this application.

Figure 2B:
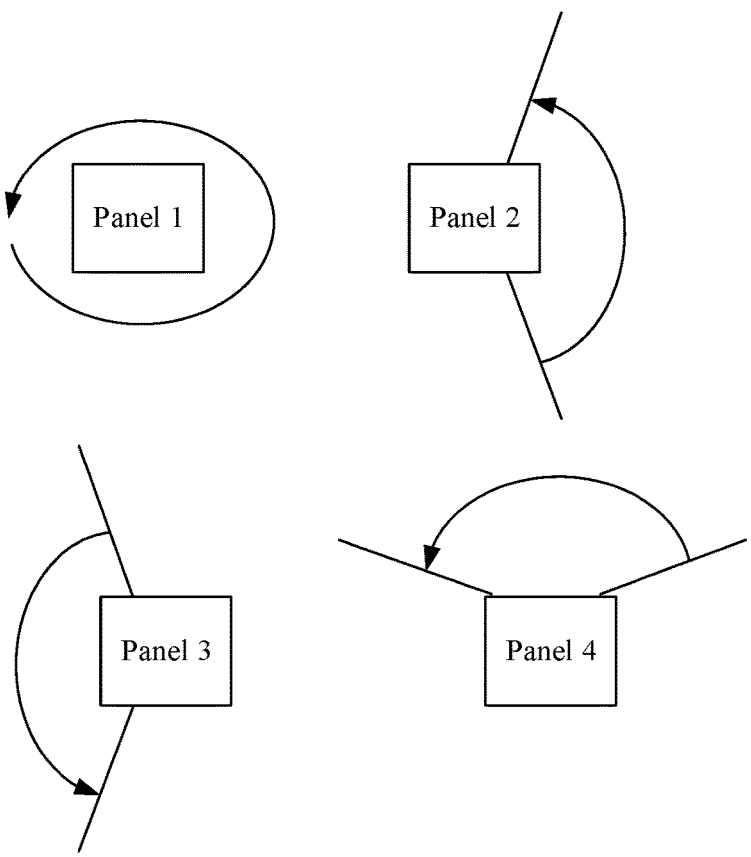
FIG. 2B is a schematic diagram of coverage areas of beams formed on panels of a terminal according to an embodiment of this application.

Referring to FIG. 2B, because each panel has a different configuration, or because each panel has a different location in the terminal 102, a coverage area of a beam that can be formed on each panel varies. For example, as shown in FIG. 2B, four panels are included in a same terminal 102. A beam covering all directions may be formed on a panel 1, a beam covering a right sector may be formed on a panel 2, a beam covering a left sector may be formed on a panel 3, and a beam covering an upper sector may be formed on a panel 4. It may be understood that a plurality of panels of the terminal 102 may simultaneously point to different directions, in other words, beams with different directions may be simultaneously formed on different panels.

In a future communications system, the network device 101 may also be configured with an antenna array, and may also receive and send a signal through switching between different beams. To cover an entire cell corresponding to the network device 101, the network device 101 needs to use a plurality of beams with different directions. In other words, in the wireless communications system 100, both the network device 101 and the terminal 102 may use a plurality of beams for communication.

When the terminal camps on a serving cell, and a network device corresponding to the serving cell performs signal transmission with the terminal, the terminal may receive and send a signal by using one or more panels. Optionally, the quantity of panels used when the terminal receives the signal may be determined based on a usage status and based on a type of a transmitted service or a traffic volume. Because the network device may send different types of services by using different beams, and may send a plurality of services by using a plurality of beams when the traffic volume is comparatively large, a corresponding terminal may receive a service by using a plurality of beams. For example, it is assumed that the terminal includes two panels, and beams that may be formed on the two panels may cover all directions, as shown in FIG. 3A and FIG. 3B.

Figure 3A:
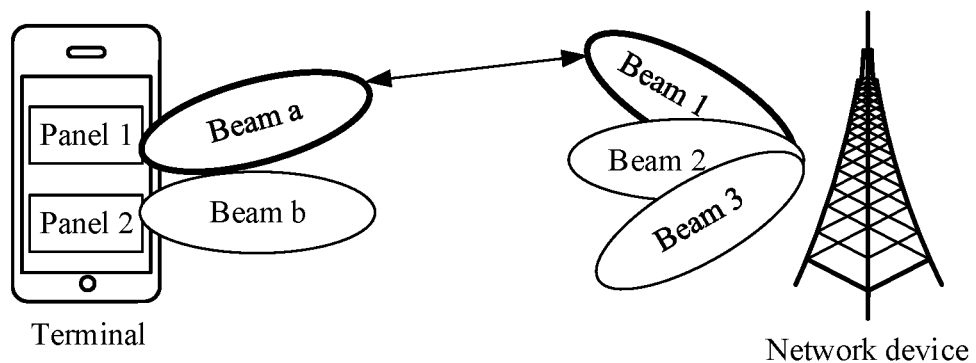
FIG. 3A and FIG. 3B are schematic diagrams of receiving a signal by a terminal by using a panel according to an embodiment of this application.

Referring to FIG. 3A, if a network device sends one signal to a terminal, and the signal is sent by using a beam 1, the terminal may select a panel 1 to form a beam a pointing to the network device, and receive the signal by using the beam a. In FIG. 3A, a panel used by the terminal includes the panel 1, and the beam 1 and the beam a are a beam pair.

Figure 3B:
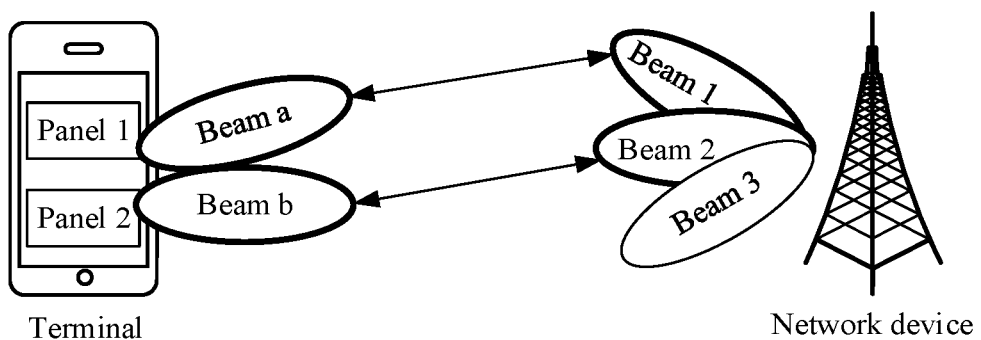

Referring to FIG. 3B, if a network device sends two signals to a terminal, and the two signals are respectively sent by using a beam 1 and a beam 2, the terminal may select a panel 1 to form a beam a pointing to the network device, and a panel 2 to form a beam b pointing to the network device, and receive one of the signals by using each of the beam a and the beam b. In FIG. 3B, panels used by the terminal include the panel 1 and the panel 2, the beam 1 and the beam a are a beam pair, and the beam 2 and the beam b are a beam pair.

It can be learned from FIG. 3A and FIG. 3B that in a downlink signal transmission process, the terminal may receive a signal by using a single beam, or may receive a signal by using a plurality of beams. In other words, the terminal may use one or more panels.

For ease of description, in some embodiments of this application, a beam used by the terminal to receive a signal is referred to as a receive beam. This application mainly discusses how to simultaneously perform service transmission and cell measurement on a terminal side by using receive beams formed on a plurality of panels of the terminal.

In some embodiments of this application, on the terminal side, the same receive beams are beams with the same direction, or beams with the same spatial receive parameter and/or the same antenna port. For example, at least one of the following parameters is the same or has a determined correspondence: an angle of arrival (AoA), a dominant angle of arrival (dominant AoA), an average angle of arrival, a power angular spectrum (PAS) of an angle of arrival (PAS of AoA), an angle of departure (AoD), a dominant angle of departure, an average angle of departure, a power angular spectrum of an angle of departure, beamforming of a transmit beam of a terminal, beamforming of a receive beam of a terminal, spatial channel correlation, beamforming of a transmit beam of a base station, beamforming of a receive beam of a base station, an average channel gain, an average channel delay, a delay spread, a Doppler spread, and the like.

Figure 4:
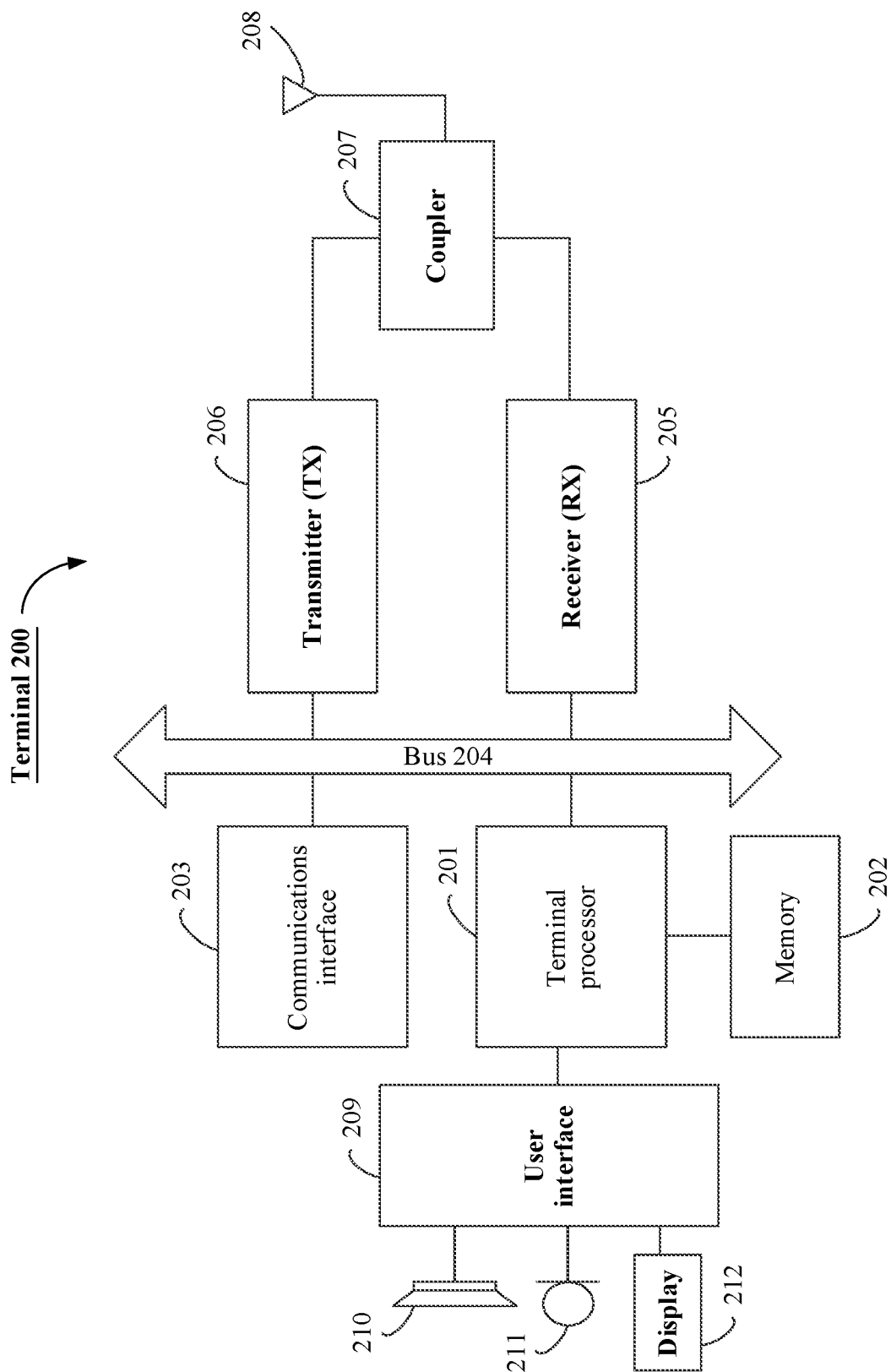
FIG. 4 is a schematic diagram of a hardware structure of a terminal according to an embodiment of this application.

FIG. 4 shows a terminal 200 provided in some embodiments of this application. As shown in FIG. 4, the terminal 200 may include one or more terminal processors 201, a memory 202, a communications interface 203, a receiver 205, a transmitter 206, a coupler 207, an antenna 208, a terminal interface 202, and an input/output module (including an audio input/output module 210, a key input module 211, a display 212, and the like). These components may be connected by using a bus 204 or in another manner. In FIG. 4, for example, the components are connected by using the bus.

The communications interface 203 may be configured for communication between the terminal 200 and another communications device, for example, a network device. The communications interface 203 may be a long term evolution (LTE) (4G) communications interface, or a 5G or future new radio communications interface. Not limited to a wireless communications interface, the terminal 200 may be further provided with a wired communications interface 203, for example, a local access network (LAN) interface.

The transmitter 206 may be configured to transmit a signal output by the terminal processor 201, for example, implement directional sending through beamforming. The receiver 205 may be configured to receive a mobile communication signal received by the antenna 208, for example, implement directional receiving through beamforming. In some embodiments of this application, a transmitter 305/receiver 306 may include a beamforming controller, configured to multiply a transmitted signal/received signal and a weight vector W1, . . . , or Wm, to control directional transmission/reception of the signal. The beamforming controller in the transmitter 305/receiver 306 changes a value obtained by multiplying the transmitted signal/received signal and the weight vector, so that terminal beamforming mentioned in some embodiments of this application can be implemented.

In some embodiments of this application, the transmitter 206 and the receiver 205 may be considered as a wireless modem. The terminal 200 may have one or more transmitters 206 and one or more receivers 205. The antenna 208 may be configured to convert electromagnetic energy in a transmission line into an electromagnetic wave in free space, or convert an electromagnetic wave in free space into electromagnetic energy in a transmission line. The coupler 207 is configured to divide the mobile communication signal received by the antenna 208 into a plurality of signals and distribute the plurality of signals to a plurality of receivers 205.

In addition to the transmitter 206 and the receiver 205 shown in FIG. 4, the terminal 200 may further include another communications component, for example, a GPS module, a Bluetooth module, a wireless fidelity (Wi-Fi) module, and the like. Not limited to the foregoing described wireless communication signal, the terminal 200 may further support another wireless communication signal, for example, a satellite signal and a short-wave signal. Not limited to wireless communication, the terminal 200 may be further provided with a wired network interface (for example, a LAN interface) to support wired communication.

The input/output module may be configured to implement interaction between the terminal 200 and a terminal/an external environment, and may mainly include the audio input/output module 210, the key input module 211, the display 212, and the like. The input/output module may further include: a camera, a touchscreen, a sensor, and the like. The input/output module communicates with the terminal processor 201 by using the terminal interface 209.

The memory 202 is coupled to the terminal processor 201, and is configured to store various software programs and/or a plurality of sets of instructions. The memory 202 may include a high-speed random access memory, and may include a non-volatile memory, for example, one or more disk storage devices, flash memory devices, or another non-volatile solid-state storage device. The memory 202 may store an operating system (referred to as a system below), for example, an embedded operating system such as ANDROID, iOS, WINDOWS, or LINUX. The memory 202 may further store a network communications program. The network communications program may be used to communicate with one or more additional devices, one or more terminal devices, or one or more network devices. The memory 202 may further store a terminal interface program. The terminal interface program may vividly display content of an application program by using a graphical operation interface, and receive, by using an input control such as a menu, a dialog box, or a key, a control operation performed by a terminal on an application.

In some embodiments of this application, the memory 202 may be configured to store a program for implementing, on a terminal 200 side, the signal measurement method provided in one or more embodiments of this application. For implementation of the signal measurement method provided in one or more embodiments of this application, refer to the following embodiments.

The terminal processor 201 may be configured to read and execute a computer readable instruction. The terminal processor 201 may be configured to invoke a program stored in the memory 212, for example, the program for implementing, on the terminal 200 side, the signal measurement method provided in one or more embodiments of this application, and execute an instruction included in the program.

It may be understood that the terminal 200 may be the terminal 102 in the wireless communications system 100 shown in FIG. 1, and may be implemented as a mobile device, a mobile station, a mobile unit, a radio unit, a remote unit, a terminal agent, a mobile client, or the like.

It should be noted that the terminal 200 shown in FIG. 4 is merely an implementation of the embodiments of this application. In actual application, the terminal 200 may also include more or fewer components. This is not limited herein.

Based on the foregoing embodiments respectively corresponding to the wireless communications system 100 and the terminal 200, an embodiment of this application provides a signal measurement method. In some embodiments of this application, in a process of performing service transmission between the terminal and the network device, the terminal may complete cell measurement by using an idle panel.

To facilitate understanding of this application, technical terms in this application are first described.

(1) First network device

In some embodiments of this application, a network device corresponding to a cell in which the terminal is located is referred to as the first network device.

The first network device may be the network device 101 shown in FIG. 1, and may be implemented as a BTS, an eNB, and a base station in a 5G system or a new radio (NR) system, or may be an AP, a transmission reception point (trans TRP), a central unit (CU), or another network entity.

(2) First panel and second panel

In some embodiments of this application, the terminal is configured with a plurality of panels. When performing service transmission with the first network device, the terminal may use one or more panels. One or more panels used by the terminal to perform service transmission with the first network device are referred to as the first panel, and one or more idle panels that are not used to perform service transmission with the first network device are referred to as the second panel.

In some embodiments of this application, the first panel and the second panel may be selected by the terminal, or may be predetermined. Details are described below.

(1) The first panel and the second panel are selected by the terminal according to a selection policy.

It may be understood that when performing service transmission with the first network device, the terminal selects the first panel used for service transmission, and the second panel is also selected.

When selecting the first panel and the second panel, the terminal may have the following three selection policies.

In a first selection policy, the terminal randomly selects the first panel and the second panel from all configured panels. In other words, provided that a panel can form a beam pointing to the first network device, when the terminal and the first network device perform service transmission, the terminal may select the panel as the first panel.

In a second selection policy, the terminal selects a panel with a widest beam coverage area as the second panel. For example, referring to FIG. 2B, the terminal may select a panel 1 on which beams covering all directions can be formed as the second panel. To be specific, when performing service transmission with the first network device, the terminal performs service transmission by using only a panel 2, a panel 3, and a panel 4, and reserves the panel 1 as the second panel.

In a third selection policy, the terminal selects a panel with a wide coverage area of total beams as the second panel. For example, referring to FIG. 2B, the terminal may select a panel 2 and a panel 3 as the second panel. A beam covering a right sector may be formed on the panel 2, and a beam covering a left sector may be formed on the panel 3. This is equivalent to that beams covering all directions may be jointly formed on the panel 2 and the panel 3. To be specific, when performing service transmission with the first network device, the terminal performs service transmission by using only a panel 1 and a panel 4, and reserves the panel 2 and the panel 3 as the second panel.

(2) The first panel and the second panel are predetermined.

Among a plurality of panels configured for the terminal, some panels are predefined as the second panel. The terminal selects, only from panels except the second panel, a panel used for service transmission.

Optionally, one or more panels having a comparatively wide beam coverage area in the plurality of panels configured for the terminal may be defined as the second panel.

(3) A function of the first panel

In some embodiments of this application, the first panel may form a beam pointing to the first network device. The terminal may perform service transmission with the first network device by using the beam formed on the first panel. In other words, the terminal may send a service to the first network device by using the beam formed on the first panel, or may receive, by using the first panel, a service sent by the first network device. Optionally, a service transmitted between the terminal and the first network device may be a time-consuming data service, for example, video download or data upload.

Optionally, when the terminal measures a candidate cell, if a receive beam that needs to be currently measured is the same as a receive beam used by the terminal to receive a service, the terminal may perform beam measurement by using the receive beam used to receive the service. For a definition of the same beam, refer to the foregoing description. For a specific operation of beam measurement, refer to related description of the key technical point (4).

(4) A function of the second panel

In some embodiments of this application, the second panel is configured to form a beam pointing to the candidate cell, and there may be a plurality of candidate cells.

The terminal performs candidate cell measurement by using the second panel, and the candidate cell measurement may be divided into two main steps.

Step 1: The terminal performs candidate cell search by using a receive beam on the second panel.

A cell whose signal coverage area includes the terminal is a candidate cell corresponding to the terminal. In some embodiments of this application, the terminal determines the candidate cell in a beam scanning manner.

Beam scanning means that the terminal adjusts an antenna array on the second panel (a weighting coefficient of each array element in the antenna array may be adjusted), to separately form a plurality of receive beams pointing to different directions, and receives, by using the receive beam, a downlink signal sent by another network device. If the downlink signal sent by the another network device is received, it indicates that the terminal is in a signal coverage area of the network device, and a cell corresponding to the network device is the candidate cell.

For example, referring to FIG. 1, it is assumed that a cell in which the terminal is currently located is a cell 1, and beam scanning is performed by using the second panel. It is assumed that four beams can be formed on the second panel: a beam 2, a beam 3, a beam 4, and a beam 5.

In first scanning, the terminal adjusts the antenna array on the second panel, to form the beam 2. A downlink signal sent by a second network device may be received on the beam 2, and the terminal may determine a cell identifier (cell ID) of the cell 2 by using the received downlink signal.

In some embodiments of this application, the downlink signal may include at least one of the following: a synchronization signal block (SS block) and a channel state information-reference signal (CSI-RS). The SS block corresponds to N OFDM symbols. One SS block includes at least one of the following: a primary synchronization signal (PSS), a secondary synchronization signal (SSS), a physical broadcast signal (PBCH), or a demodulation reference signal (DMRS) (for example, a PBCH DMRS).

In second scanning, the terminal adjusts the antenna array on the second panel, to form the beam 3. Similarly, the terminal may receive a downlink signal sent by a third network device, and determine an identifier of the cell 3.

In third scanning, the terminal adjusts the antenna array on the second panel, to form the beam 4. Similarly, the terminal may receive a downlink signal sent by a fourth network device, and determine an identifier of the cell 4.

In fourth scanning, the terminal adjusts the antenna array on the second panel, to form the beam 5. If the terminal does not receive any downlink signal on the beam 5, the terminal may determine that there is no candidate cell in a direction to which the beam 5 points.

It may be understood that when the second panel includes a plurality of panels, the foregoing four times of scanning may be simultaneously performed. It may be understood that a process in which the terminal separately forms four beams to receive the signal is beam scanning.

The terminal may determine an identifier and a direction of the candidate cell through beam scanning. The direction of the candidate cell determined by the terminal may be represented by using a beam, and may be shown in the following Table 1:

TABLE 1

| Candidate Cell identifier | Direction (beam) |
| --- | --- |
| Cell ID 2 | Beam 2 |
| Cell ID 3 | Beam 3 |
| Cell ID 4 | Beam 4 |

Step 2: The terminal performs beam measurement on a beam toward a candidate cell which is found.

The terminal receives, by using a beam in a direction where the candidate cell is located, a downlink signal sent by a network device corresponding to the candidate cell, and obtains a beam measurement value based on a received downlink signal.

The beam measurement value may include values of parameters such as reference signal received power (RSRP), reference signal received quality (RSRQ), and the like. The beam measurement value reflects quality of a channel between the terminal and the candidate cell, and the beam measurement value also reflects service signal quality of the candidate cell on the terminal.

After step 2, the terminal may obtain a beam measurement value of each candidate cell.

Figure 5:
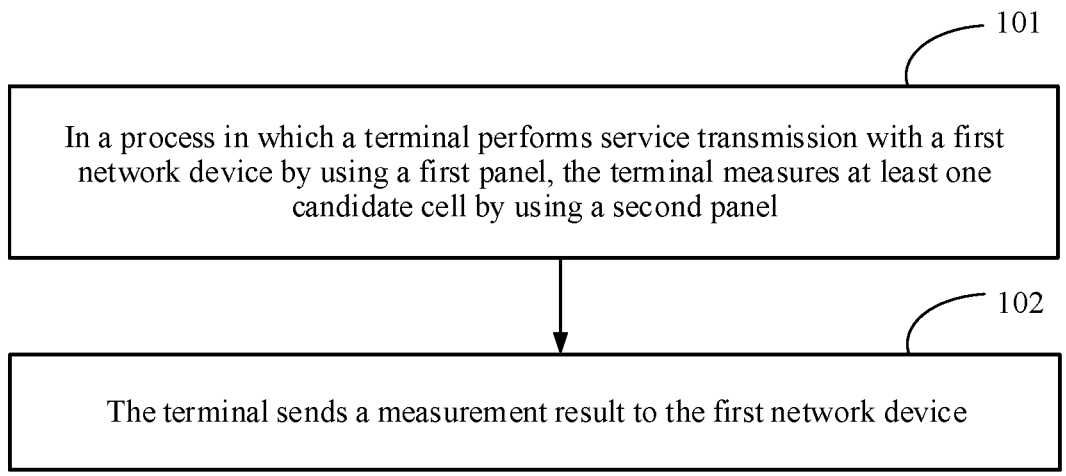
FIG. 5 is a schematic flowchart of a signal measurement method according to an embodiment of this application.

Based on the foregoing technical terms, the following describes the signal measurement method in detail. In the signal measurement method according to some embodiment of this application, when performing service transmission with the first network device by using the first panel, the terminal may complete measurement for the candidate cell by using the second panel. Referring to FIG. 5, the method may include the following steps.

S101: In a process in which a terminal performs service transmission with a first network device by using a first panel, the terminal measures at least one candidate cell by using a second panel.

In some embodiments of this application, the first panel may include at least one panel, and the second panel may include at least one panel. For selection and functions of the first panel and the second panel, refer to related descriptions of the foregoing key technical points (2), (3), and (4).

In one embodiment, the second panel can form a plurality of receive beams covering all directions, and the terminal may measure at least one candidate cell by using the plurality of beams.

In a process in which the terminal performs service transmission with the first network device by using the first panel, the terminal may be triggered to measure the at least one candidate cell in the following two cases.

In a first case, the terminal may be triggered to measure the at least one candidate cell when the first network device sends candidate cell measurement requirement to the terminal.

In a second case, the terminal may be triggered to measure the at least one candidate cell when signal quality of a downlink signal currently sent by the first network device is lower than a preset threshold. The signal quality may be determined by amplitude hysteresis, a quantity of downlink signals, or time-to-trigger.

The candidate cell measurement may be intra-frequency measurement (Intra-frequency measurement), or may be inter-frequency measurement (inter-frequency measurement). Intra-frequency measurement means that a cell in which the terminal is currently located (a cell corresponding to the first device) and a to-be-measured candidate cell are on the same carrier frequency (a center frequency), and inter-frequency measurement means that a cell in which the terminal is currently located and a to-be-measured candidate cell are not on the same carrier frequency (a center frequency).

In step S101, when candidate cell measurement is intra-frequency measurement, the terminal may use the same transceiver to transmit a service with the first network device on the same frequency by using the first panel, and measure the candidate cell by using the second panel. The two operations may be performed simultaneously, and service transmission between the terminal and the first network device does not be affected.

In step S101, when candidate cell measurement is inter-frequency measurement, the terminal may configure a plurality of transceivers, which respectively correspond to different panels. It is assumed that the cell in which the terminal is currently located works on a first frequency, and the candidate cell works on a second frequency. The terminal may transmit the service on the first frequency by using a transceiver corresponding to the first panel, and measure the candidate cell on the second frequency by using a transceiver corresponding to the second panel. The two operations may be performed simultaneously, and service transmission between the terminal and the first network device does not be affected.

It can be learned from the foregoing that the terminal may measure the candidate cell while transmitting the service.

S102: The terminal sends a measurement result to the first network device.

After step S102, the terminal determines a beam measurement value of each candidate cell. The terminal sends the measurement result to the first network device based on the beam measurement value of each candidate cell, where the measurement result includes information about a target candidate cell.

The target candidate cell is selected by the terminal from a plurality of candidate cells based on the beam measurement value of each candidate cell. The target candidate cell selected by the terminal may be a candidate cell whose channel quality or serving signal quality is better than that of a cell in which the terminal is currently located. For example, RSRQ of the cell in which the terminal is currently located is a first value, and if a value of the RSRQ of a candidate cell is greater than the first value, the terminal may determine the candidate cell as the target candidate cell.

Information about the target candidate cell may include at least one of the following: an identifier of the target candidate cell and a beam measurement value corresponding to the target candidate cell.

According to the signal measurement method shown in FIG. 5, regardless of whether a measurement GAP is configured for the terminal, the terminal can complete measurement for the candidate cell while transmitting a service, to avoid service transmission interruption.

The foregoing describes the method in detail. To better implement the foregoing solution, this application further provides a corresponding apparatus.

Figure 6:
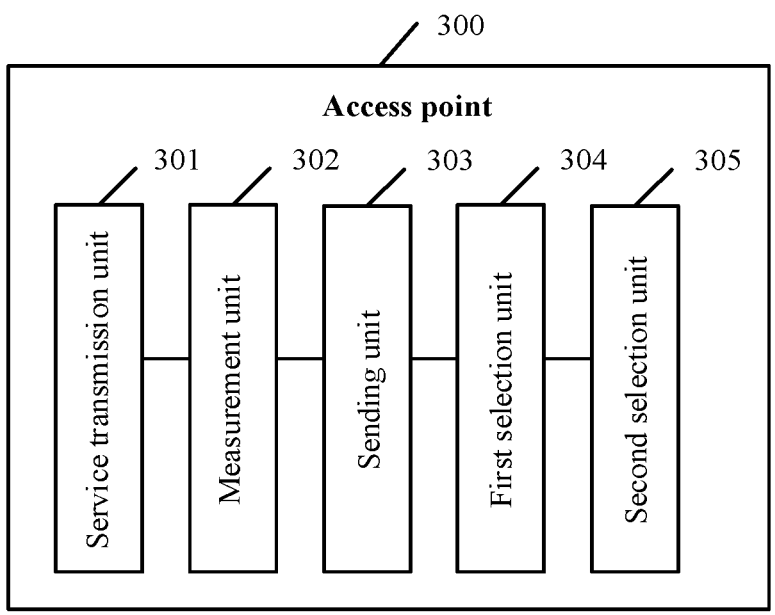
FIG. 6 is a functional block diagram of a terminal according to an embodiment of this application.

FIG. 6 is a functional block diagram of an implementation of a terminal 300 according to one embodiment of this application. The terminal 300 may include a service transmission unit 301, a measurement unit 302, a sending unit 303, and a first selection unit 304, where the service transmission unit 301 is configured to perform service transmission with a first network device by using a first panel;

the measurement unit 302 is configured to: in a process in which the service transmission unit 301 performs service transmission with the first network device by using the first panel, measure at least one candidate cell by using a second panel, where the terminal is configured with a plurality of panels, the plurality of panels include the first panel and the second panel, the first panel is configured to form a beam pointing to the first network device, and the second panel is configured to form a beam pointing to the candidate cell; and the sending unit 303 is configured to send a measurement result to the first network device, where the measurement result includes information about a target candidate cell; and the target candidate cell is selected by the first selection unit 304 from the at least one candidate cell.

Optionally, the measurement unit 302 is configured to adjust an antenna array on the second panel, to separately form a plurality of receive beams pointing to different directions, and measure the at least one candidate cell by using the plurality of receive beams.

Optionally, the measurement unit 302 is configured to perform candidate cell search by using the plurality of receive beams, and perform beam measurement on a beam by using which a candidate cell is found.

Optionally, the terminal 30 further includes a second selection unit 305, where the second panel is selected by the second selection unit 305 from the plurality of panels according to a selection policy; or the second panel is a panel that is in the plurality of panels and that is dedicated to candidate cell measurement.

Optionally, the second panel may form a plurality of receive beams covering all directions.

Optionally, when a receive beam used for service transmission is different from a receive beam used to measure the at least one candidate cell, the measurement unit 302 measures the at least one candidate cell by using the second panel.

It may be understood that for specific implementation of the functional units included in the terminal 300, refer to the method embodiment shown in FIG. 5. Details are not described herein again.

In addition, this application further provides a wireless communications system. The wireless communications system may be the communications system shown in FIG. 1, and may include a terminal and a network device. The terminal may be the terminal in the method embodiment shown in FIG. 5, and the network device may include the first network device and each network device corresponding to the candidate cell in the method embodiment shown in FIG. 5.

In some embodiments of this application, the access point may be the terminal shown in FIG. 4 or FIG. 6. For specific implementation of the terminal, refer to the foregoing method embodiments. Details are not described herein again.

In conclusion, by implementing some embodiments of this application, regardless of whether a measurement GAP is configured for the terminal, the terminal may complete measurement for the candidate cell while transmitting a service, to avoid service transmission interruption.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk), or the like.

What is claimed is:

1. A signal measurement method, comprising:
   performing, by a terminal, service transmission with a first network device by using a first panel via a first receive beam;
   measuring, by the terminal, simultaneously with the performing of the service transmission, at least one candidate cell by using a second panel via a second receive beam that is different from the first receive beam; and
   sending, by the terminal, a measurement result to the first network device, wherein the measurement result comprises information about a target candidate cell, and the target candidate cell is selected by the terminal from the at least one candidate cell, wherein
   the terminal is configured with a plurality of panels including the first panel and the second panel,
   the first panel is configured to form a beam pointing to the first network device, and
   the second panel is configured to form a beam pointing to the at least one candidate cell and is dedicated to candidate cell measurement.

2. The method according to claim 1, wherein the measuring, by the terminal, of the at least one candidate cell by using the second panel comprises:
   adjusting, by the terminal, an antenna array on the second panel, to separately form a plurality of receive beams pointing to different directions; and
   measuring the at least one candidate cell by using the plurality of receive beams.

3. The method according to claim 2, wherein the measuring of the at least one candidate cell by using the plurality of receive beams comprises:
   performing candidate cell search by using the plurality of receive beams; and
   performing beam measurement on a beam toward the at least one candidate cell which is found.

4. The method according to claim 1, wherein the second panel forms a plurality of receive beams covering all directions.

5. A non-transitory computer readable storage medium, comprising an instruction, wherein when the instruction is run on a computer, the computer is enabled to perform the method according to claim 1.

6. A non-transitory computer program product comprising a computer program, wherein when the computer program product is run on a computer, the computer is enabled to perform the method according to claim 1.

7. A terminal, comprising:
   a plurality of panels, including a first panel and a second panel, the first panel being configured to form a beam pointing to a first network device, and the second panel being configured to form a beam pointing to at least one candidate cell and being dedicated to candidate cell measurement;
   a service transmission unit configured to perform service transmission with the first network device by using the first panel via a first receive beam;
   a measurement unit configured to measure, simultaneously with the performing of the service transmission by the service transmission unit, at least one candidate cell by using the second panel via a second receive beam that is different from the first receive beam; and
   a sending unit configured to send a measurement result to the first network device, wherein the measurement result comprises information about a target candidate cell, and the target candidate cell is selected from the at least one candidate cell.

8. The terminal according to claim 7, wherein the measurement unit is configured to adjust an antenna array on the second panel, to separately form a plurality of receive beams pointing to different directions, and measure the at least one candidate cell by using the plurality of receive beams.

9. The terminal according to claim 8, wherein to measure the at least one candidate cell by using the plurality of receive beams by the measurement unit, the measurement unit is further configured to perform candidate cell search by using the plurality of receive beams, and to perform beam measurement on a beam toward the at least one candidate cell which is found.

10. The terminal according to claim 7, wherein the second panel forms a plurality of receive beams covering all directions.

* * * * *